Patented Nov. 1, 1932

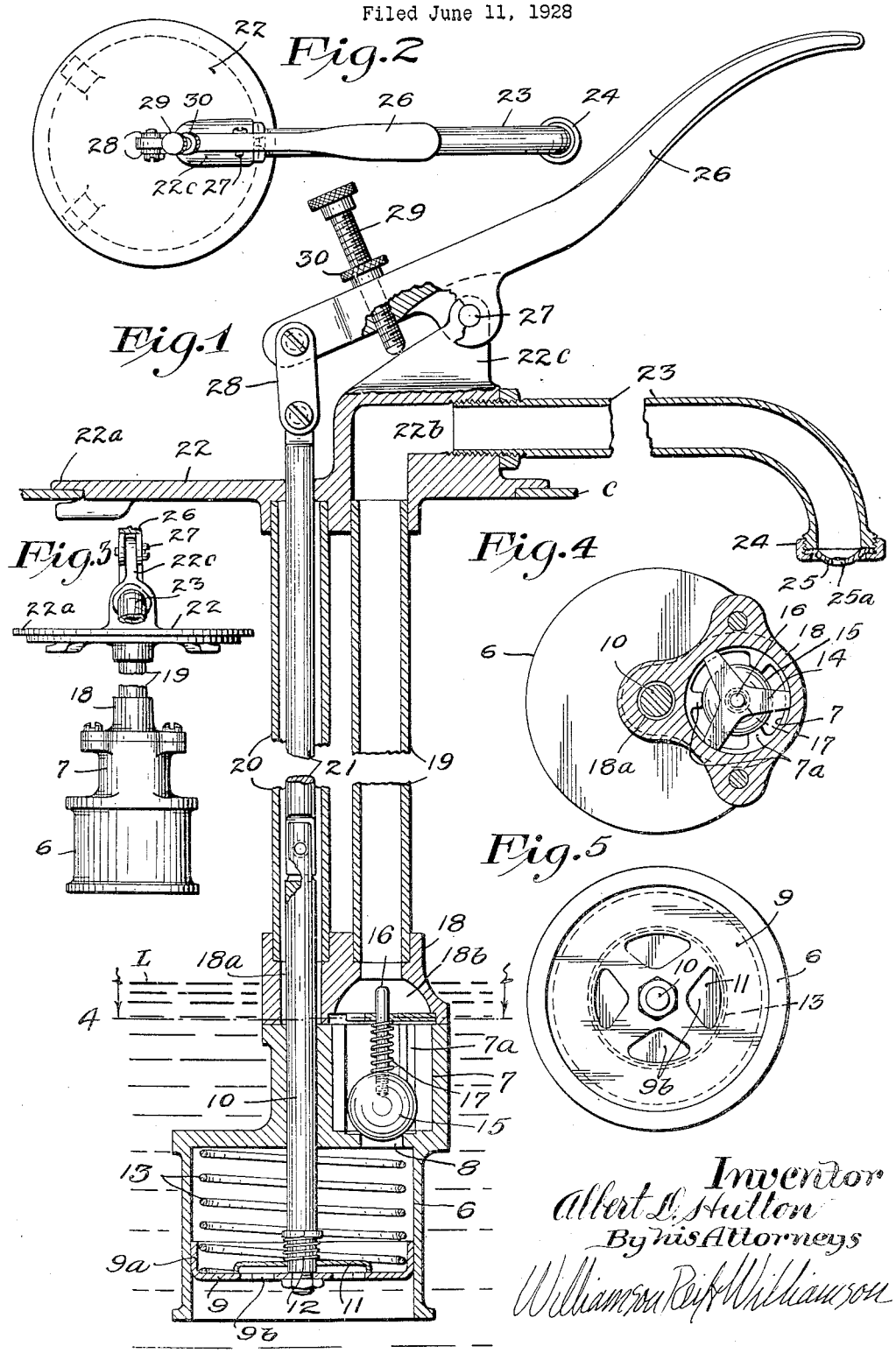

1,886,022

UNITED STATES PATENT OFFICE

ALBERT D. HUTTON, OF MINNEAPOLIS, MINNESOTA, ASSIGNOR, BY MESNE ASSIGNMENTS, TO DELBERT L. RAND, OF MINNEAPOLIS, MINNESOTA

LIQUID DISPENSING AND MEASURING DEVICE

Application filed June 11, 1928. Serial No. 284,289.

This invention relates to a device for dispensing and measuring liquid and while having wide general application is especially adapted for use in pumping and dispensing measured quantities of liquid from a container.

Many devices have been used for dispensing definite quantities of material, but these for the most part, have been complicated, inefficient in uniformally measuring the quantities dispensed, prohibitive from a manufacturing standpoint, or have been ineffective to prevent dripping of the liquid or other material after a charge is dispensed.

It is the main object of my invention to provide an extremely simple but highly efficient liquid dispenser which will obviate the above noted objections to commercial dispensers now in use.

A further object is to provide a liquid dispenser and measurer which may be economically manufactured, which will accurately dispense measured charges of liquid, which may be adjusted to vary the volume of the charge dispensed, and which will permit passage of foreign material, such as waste, sawdust, or small rags without injury to the parts of the device.

Still another object is to provide a device of the class above described, which will withstand heavy and continuous wear without danger of leakage or dripping.

It is a further object to provide a highly efficient liquid dispenser which may be constructed as a unit for insertion within a cask or container without reconstructing the container.

These and other objects and advantages of the invention will be apparent from the following description made in connection with the accompanying drawing wherein like reference characters refer to similar parts throughout the several views and in which:

Fig. 1 is a vertical section of a preferred embodiment of my invention taken longitudinally;

Fig. 2 is a plan view of the device;

Fig. 3 is a rear elevation of the device with some parts broken away;

Fig. 4 is a cross section taken on the line 4—4 of Fig. 1; and

Fig. 5 is a bottom plan view of the device showing the piston within the cylinder at the lower end of my device.

As illustrated in the drawing, an embodiment of my device is shown mounted in a container, such as a cask or tank C having liquid disposed therein to a level L. My dispensing and measuring device is constructed as a unit. The form shown is adapted to be inserted and supported from the top of the container C, the lower end projecting below the level of the liquid. At the lower end of my dispenser I provide a casing usually in the form of a casting having a relatively large open ended cylinder 6 at its lower portion and a relatively small discharge chamber 7 disposed above said cylinder and communicating eccentrically therewith by means of a small cylindrical port 8 disposed concentrically of chamber 7. A suitable piston 9 works within cylinder 6 as shown having an upwardly extending flange 9a engaging the inner periphery of cylinder 6 and having a plurality of circumferentially arranged ports 9b through the body thereof. Piston 9 is secured to the lower end of a piston rod 10 and is provided on its upper side with a suitable check valve 11, as shown of the disc type, said check valve being slidably mounted upon the lower extremity of rod 10 and being yieldingly held in closed position by a coiled spring 12 surrounding rod 10. Between the body of piston 9 and the top of cylinder 6 I interpose a relatively large coiled spring 13, normally holding piston 9 in downwardly projected position.

The interior of discharge chamber 7 is provided with a plurality (shown as 3) of longitudinally extending circumferentially disposed ribs 7a, said ribs extending inwardly a short distance from the inner periphery of chamber 7 and extending substantially the full height of said chamber. At the top of said chamber a small spider 14 is fixed, said spider having a central aperture or bearing concentric with the intake port 8 of chamber 7. A spherical valve 15 is mounted in chamber 7 for movement longitudinally of said chamber, the diameter of the valve or ball being such that it will snugly fit within the several ribs 7a with sufficient freedom for vertical sliding movement, and may be of proper size to tightly fit in the upper end of intake port 8. A vertical pin 16 is fixed to the upper end of ball 15, said pin passing through the central bearing in spider 14, thereby assisting in precisely guiding the valve in its slidable movement. As shown, a small coiled spring 17 surrounds pin 16 and is interposed between the lower sides of spider 14 and the top of ball 15, normally holding the valve against its seat formed by intake port 8. For convenience in manufacturing and assembling the device, a second casting 18 is provided having a vertical passage 18a vertically alined with the piston 10 and having a tapered passage 18b vertically alined with the discharge chamber 7 and terminating at its upper end in a socket which receives a tubular conduit 19.

A tubular member 20 surrounds the upper end of piston rod 10 and is of sufficient diameter to allow lateral movement of a connecting rod 21 pivotally secured at its lower end to the upper end of piston 10. The upper ends of tube 20 and conduit 19 are fixed, as illustrated, to a suitable plug member 22, said plug member being supported from the top of the container C, and as shown, being provided with a flange 22a adapted to rest upon the upper surface of the container. Plug 22 is also provided with an L-shaped passage 22b communicating at its lower end with the upper end of the conduit 19 and having fixed to the opposite end thereof a discharge pipe 23, said pipe, as shown, terminating in a downwardly curved delivery nozzle. Said delivery nozzle is especially designed to prevent any subsequent dripping of material after a charge is completed and to this end comprises a packing nut 24 having threaded engagement with the extremity of discharge pipe 23 and co-operating with the extremity of said pipe to clamp the concavo-convex discharge plate 25, plate 25 having a discharge port at the center of its concavo-convex portion.

To operate piston 9, I provide a lever 26 of the first order pivotally connected by a pin 27 to a suitable upstanding lug 22c carried by plug member 22. The longer end of lever 26 forms a handle, while the shorter or working end is connected to the upper end of connecting rod 21 by means of a short link 28. The stroke of piston 9 may be adjusted by a suitable set screw 29 having threaded engagement with the working end of lever 26 and adapted to abut at its lower end the outer edge of lug 22c, said screw 29 is preferably provided with a jamb nut 30 adapted to maintain the set screw in a desired position.

*Operation*

When the handle end of lever 26 is pressed, piston 9 is moved upwardly in cylinder 6 against the tension of coiled spring 12 forcing the quantity of liquid thereabove through the circular port 8 and around the ball 15 and through passage 7, conduit 19 and out discharge pipe 23. The pressure of the liquid against ball 15 quickly unseats said ball sliding the same upwardly and enabling the liquid to pass through discharge pipe 7. The moment handle 26 is released coiled spring 12 causes piston 9 to move downwardly returning to normal position, the partial vacuum in the upper portion of cylinder 6 causing check valve 11 to be opened to permit liquid below the piston to pass through the piston in its return movement filling the upper portion of the chamber in preparation for the next charge. It will also be noted that immediately upon the return movement of piston 9 ball 15 is quickly seated in its circular seat at the upper end of port 8, the initial movement of piston 9 together with the force of coiled spring 17 and gravity causing the ball 15 to move downwardly. Since the ball valve is precisely guided by the circumferentially disposed ribs 7a and the pin 16 at its upper end it will be perfectly seated to prevent discharge of additional liquid from the delivery spout. After lever 26 is released the port 8a at the bottom of passage 7 is perfectly sealed so that no movement of the liquid in conduit 19 or in discharge pipe 23 can occur. The construction of the passage 7, ball valve 15 and the relation between said passage with the upper end of cylinder 6 is of great importance, since the valve precisely cuts off the flow of liquid when a measured charge has been dispensed.

To positively prevent a few drops of liquid from dripping from the delivery nozzle I have provided the discharge plate 25, which in exhaustive tests has proven highly efficient. The port 25a through the central concavo-convex portion of plate 25 is of such diameter and contour as to become sealed by the liquid preventing dripping of the same, the moment the port 8 at the lower end of the discharge chamber is sealed.

It will be apparent that even if small foreign matter, such as sawdust, small rags, string or waste gets into the cylinder 6 the same may pass through port 8 around the ball valve and through spider 14 and be discharged without injury to any of the working parts and oftentimes without causing inaccuracy in the measuring of the charge with which said material is carried.

It will be obvious that the movement of lever 26 may be regulated by adjusting set screw 29 in lock nut 30, thus causing the device to dispense charges of different volume as desired. The entire device may be supported by means of the plug 22 and adapted to be suspended into containers, such as tanks, casks and the like now in standard use, by merely providing an aperture at the top of the container of substantially similar diameter to the interfitting portion of the plug.

The parts of my device are few in number, capable of manufacture at relatively low cost and can be easily assembled due to the construction of the castings and the plug member 22.

It will, of course, be understood that various changes may be made in the form, details, arrangement and proportions of the parts without departing from the scope of applicant's invention.

What is claimed is:

1. A device for dispensing measured quantities of liquid comprising a cylinder having an intake passage communicating therewith, a vertically extending discharge chamber at the upper end of said cylinder, a plunger working in said cylinder, a passage connecting the upper end of said cylinder with said discharge chamber, said passage terminating at its upper end in an annular valve seat at the bottom of said discharge chamber, said discharge chamber having a plurality of circumferentially arranged vertical ribs extending longitudinally thereof, and a spherical valve slidably engaging the edges of said circumferentially arranged ribs for precise alinement with said valve seat and normally held in closed position.

2. A device for dispensing measured quantities of liquid comprising a cylinder having an intake passage communicating therewith, a vertically extending discharge chamber at the upper end of said cylinder, a plunger working in said cylinder, means for moving said plunger toward the upper end of said cylinder a passage connecting the upper end of said cylinder with said discharge chamber, said passage terminating at its upper end in an annular valve seat at the bottom of said discharge chamber, said discharge chamber having a series of circumferentially arranged vertically extending ribs, the edges of which lie in the circumference of a circle co-axial with said valve seat and of larger diameter than said valve seat, a spherical valve slidably engaging the edges of said ribs, a guide in the upper portion of said chamber disposed co-axially of said valve seat, and a vertical pin fixed to the top of said spherical valve and working in said guide.

3. In a device for dispensing measured quantities of liquid from a container, a supporting member adapted to be mounted in the upper portion of a container, a pump cylinder adapted to be disposed in the lower portion of said container and supported from said supporting member, said cylinder having an intake passage communicating therewith and a discharge passage communicating with the upper end thereof, a plunger mounted for movement longitudinally of said cylinder, a plunger rod extending upwardly through said supporting member, a valve-equipped discharge passage, means for urging said plunger downwardly, a lever pivoted to the top of said supporting member and having one of its ends connected with said plunger rod for lifting the same, said lever having its opposite end formed as a handle an abutment element carried by said supporting member and a longitudinally adjustable stop element extending through and threadedly engaging the said end of said lever and adapted to engage said abutment element to limit the downward or intake stroke of said plunger, actuated by said urging means.

4. A device for dispensing measured quantities of liquid comprising a cylinder having an intake passage communicating with the lower end thereof, an elongated vertically extending discharge chamber communicating with the upper end of said cylinder, a plunger working in said cylinder having check-valve-controlled means to permit flow of liquid therethrough only when said plunger is moved toward said intake passage, a valve seat in the bottom of said discharge chamber comprising an annular edge, a spherical valve loosely mounted for vertical movement in said discharge chamber and of considerably less diameter than the length of said discharge chamber, the interior of said chamber having a series of longitudinally extending circumferentially spaced ribs for precisely guiding said spherical valve for alignment with said edged valve seat and a discharge conduit connected with the upper end of said discharge chamber.

5. A device for dispensing measured quantities of liquid comprising a mounting adapted to be attached to a receptacle containing liquid, a substantially vertical cylinder mounted some distance below said mounting and supported therefrom, said cylinder having an intake passage at its lower end, a plunger working in said cylinder and having check-valve-controlled means to permit flow of liquid through said plunger when the same is moved toward said intake passage, means associated with said mounting for reciprocating said plunger, an elongated vertically extending discharge chamber mounted at the upper end of said cylinder, a passage connecting the upper end of said cylinder with said discharge chamber, said passage terminating at its upper end in an annular valve seat located at the bottom of said discharge chamber and axially aligned therewith, a spherical valve of considerably less diameter than the length of said discharge chamber loosely mounted for vertical movement in said chamber, means associated with the interior of said chamber for guiding said spherical valve for precise alignment with said valve seat, and a discharge conduit extending through said mounting and supported thereby and connected at its inner end with the upper end of said discharge chamber.

6. A device for dispensing measured quantities of liquid comprising a mounting constituting a closure for an opening in the top of a receptacle containing liquid, a substantially vertical cylinder disposed some distance below said mounting and supported therefrom, said cylinder having an open lower end constituting an intake passage, a plunger working in said cylinder and having check-valve-controlled means to permit flow of liquid therethrough only when said plunger is moved toward said lower end, a spring interposed between said plunger and the upper end of said cylinder for urging said plunger downwardly, an elongated vertically extending discharge chamber connected eccentrically with the upper end of said cylinder and having communication therewith, an annular edged valve seat at the bottom of said discharge chamber and axially aligned therewith, a spherical valve loosely mounted for vertical movement in said elongated discharge chamber and having a diameter considerably less than the length of said chamber, a discharge conduit connected with said chamber and extending through said mounting and supported thereby, a vertical plunger rod extending through said mounting and slidably engaging the same, a lever pivoted to the top of said mounting and having a working end disposed above said plunger rod and connected therewith and having its opposite end formed as a handle.

In testimony whereof I affix my signature.

ALBERT D. HUTTON.